United States Patent
Sykes et al.

(10) Patent No.: US 7,489,649 B2
(45) Date of Patent: Feb. 10, 2009

(54) METHOD FOR BROADCASTING INFORMATION TO TERMINALS WITHIN A RADIOCOMMUNICATION NETWORK, AND TERMINAL MAKING USE OF SUCH METHOD

(75) Inventors: Francis Sykes, Paris (FR); Jean-Louis Lievin, Framlingham (GB)

(73) Assignee: Alcatel, Paris (FR)

( * ) Notice: Subject to any disclaimer, the term of this patent is extended or adjusted under 35 U.S.C. 154(b) by 765 days.

(21) Appl. No.: 10/742,787

(22) Filed: Dec. 23, 2003

(65) Prior Publication Data

US 2004/0151199 A1  Aug. 5, 2004

(30) Foreign Application Priority Data

Dec. 24, 2002 (FR) .................................. 02 16611

(51) Int. Cl.
*H04H 20/71* (2008.01)

(52) U.S. Cl. .................... 370/312; 370/310; 370/310.2; 340/825.49

(58) Field of Classification Search ......... 370/310–312; 455/3.01, 3.05, 825.26; 340/825.26, 825.49
See application file for complete search history.

(56) References Cited

U.S. PATENT DOCUMENTS

| 6,876,835 | B1 * | 4/2005 | Marko et al. | 455/3.06 |
| 7,158,753 | B2 * | 1/2007 | Kagan et al. | 455/3.04 |
| 7,412,205 | B2 * | 8/2008 | Järvi et al. | 455/3.04 |
| 2003/0222899 | A1 * | 12/2003 | Alvesalo | 345/716 |

FOREIGN PATENT DOCUMENTS

WO  WO 01 93505 A2  12/2001

* cited by examiner

*Primary Examiner*—Wing F. Chan
*Assistant Examiner*—Mark A. Mais
(74) *Attorney, Agent, or Firm*—Sughrue Mion, PLLC

(57) ABSTRACT

A method and device for broadcasting, within a radiocommunications network, one or more pieces of information to one or more radiocommunication terminal(s) is provided. The network includes a server and at least two different types of transmission channels, wherein the information is divided into a personal portion that is dedicated to a given terminal, and a common portion that is common to every terminal having subscribed to the network, The information is distributed over two types of data transmission channels, the first type of channel being dedicated to the personal portion of the information, the second type of channel being dedicated to the common portion of the information.

23 Claims, 1 Drawing Sheet

METHOD FOR BROADCASTING INFORMATION TO TERMINALS WITHIN A RADIOCOMMUNICATION NETWORK, AND TERMINAL MAKING USE OF SUCH METHOD

The present invention relates to a method for broadcasting information within a radiocommunication network. The invention also relates to a device making use of such method One of the application fields of the invention is, but not exclusively, that of mobile radiocommunication terminals operating within a cellular radiocommunication network. Such terminals are used by the network subscribers. A carrier operates the connections for the network subscribers.

The invention notably applies, but not exclusively, to a system according to the GSM (Global System for Mobile communications) standard.

The significant development of radiocommunication systems raises the issue of constantly growing bandwidth for data transmission. As a matter of fact, when voice transmission requires only a few dozens of kilobytes, sending an image requires several hundreds of kilobytes, while the transmission of a video clip requires several hundreds of megabytes.

Therefore, data such as images, sound or a combination of both, require a significant network capacity and bandwidth in order to be transmitted to the network subscribers' terminals.

When data of such kind is to be transmitted to several subscribers at the same time, the carrier must use as many channels as there are subscribers. This results in the issue of having to monopolize a large amount of network bandwidth, to the detriment of the transmission of voice-only communications for the other network subscribers.

A known solution (WO 01 93505) consists in providing two different types of transmission channels. The first type of channel is suited for transmitting (voice) communications. And it therefore has transmission capabilities dedicated to such communications.

The second type of channel is suited for transmitting pure data. And through such channel, pure data is transmitted to the subscribers' terminals.

However, this solution does not solve the issue of optimising the transmission of large data according to the subscribers' interest in receiving such data, as it requires to use a channel of the second kind for each subscriber.

The purpose of the invention is to offer a solution to this problem, through a method for broadcasting large data towards a group of terminals, according to predefined subscribers' profiles.

The information may be sound, images and/or text combined with the image and sound.

The invention also offers a broadcasting system allowing an optimised usage of transmission bandwidth and of network resources.

For such purpose, the invention relates to a method for broadcasting, within a telecommunications network, at least one piece of information to at least one radiocommunication terminal, said network comprising a server and at least two different types of transmission channels, wherein the information is divided into a portion said personal, dedicated to a given terminal, and another portion said common to every terminal having subscribed to such network, said information being transmitted over two types of data transmission channels, the first type of channel being dedicated to the said personal portion of the information, the second type of channel being dedicated to the said common portion of the information.

In that way, thanks to this broadcasting method, the radiocommunication network's transmission capability is optimised, and the personal portion of the information is sent only to a given terminal.

Moreover, the common portion of the information is not sent over as many channels as there are subscribers to receive it, but only over one channel per group of subscribers interested by such common portion.

The invention also relates to a system for broadcasting at least one piece of information to at least one radiocommunication terminal, said system comprising a server, located within a radiocommunication network comprising at least two different types of transmission channels, a user database, containing the profiles of the users of the terminals, and a common database shared by all the users of terminals, wherein said information is divided into a portion said personal, dedicated to a given terminal, and another portion said common to every terminal, said user database being used to build up said personal portion of the information, and said common database comprising multimedia content data that are common to every terminal user, said server having means of accessing both the user and common databases, as well as means of transmitting such data to a given terminal, over the data transmission channels of different types.

Additional features and advantages of the invention will appear at the reading of the following description of a specific realization mode for the invention, given for illustration—and not limiting—purposes, and of the drawings presented hereafter.

In the rest of the description, the invention is described as an application for radiotelephones and cellular phones. It can apply more generally to all types of radio transmitter-receivers, such as, for example, a radiomessaging device, or a personal digital assistant (PDA).

Figure 1:
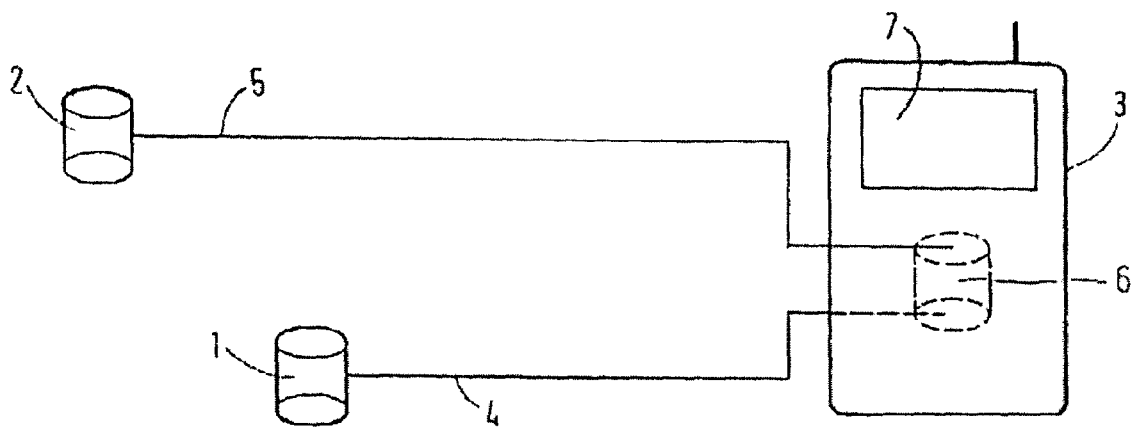
FIG. 1 is a drawing of the radiocommunication network for the broadcasting of information, according to the invention.

Referring to FIG. 1, the broadcasting system according to the invention comprises a server comprising two separate databases.

A first database 1 is a database that defines the user profile for each one of the terminals 3 located within the network. As an example, the profile may contain the user's favourite topics, his terminal type, the community he belongs to.

A second database 2 is a multimedia content database that stores multimedia-type data, such as text, images, or video.

The network also comprises two channels 4, 5 for information transfer.

Figure 2:
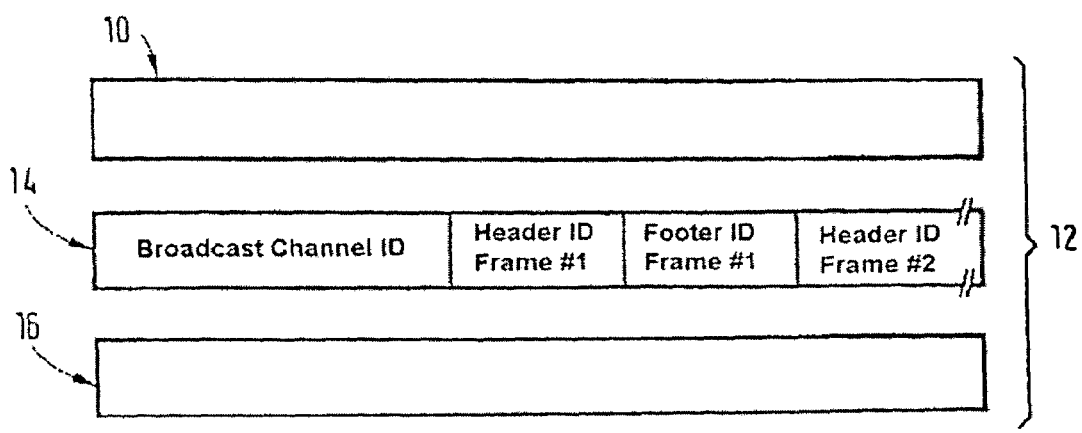
FIG. 2 represents a file containing the personal portion of the information transmitted to a terminal, according to the invention.
Figure 3:
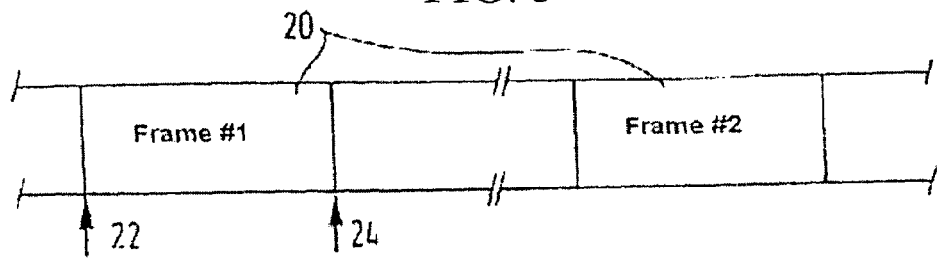
FIG. 3 represents a pair of frames carrying the common portion of the information, according to the invention.

As illustrated in FIGS. 2 and 3, the information to be transmitted to at least one terminal 3 is split into a said personal portion 10, dedicated to a given terminal, and another said common portion 20, common to all terminals.

The personal portion 10 is stored within the database of personal type 1, and the common portion 20 is stored within the database of common type 2.

The said personal portion 10 is carried by the first channel 4, allocated to a given user of a given terminal 3. In that way, the user of the terminal 3 will be the only one receiving this personal portion of the information.

The common portion 20 is carried by the second channel 5, named as 'the broadcast channel'.

According to an embodiment, the terminal 3 receives the personal portion 10 of the information, and queries the server for the common portion 20 of the information.

According to another embodiment consists for the terminal 3 can also receive both portions 10, 20 of the information, sent directly by the server.

The server formats the personal portion 10 of the information into a metafile 12, as indicated in FIG. 2.

The server then transmits to the terminal 3 the personal portion 10 of the information within the metafile 12.

The metafile 12 therefore contains the personal portion 10 of the information, a pointer 14, and synchronization data 16.

The pointer 14 comprises:

the identification number of the broadcast channel 4, used for transmitting the common portion of the information to be received by the terminal 3, the frame header and footer IDs, as described in FIG. 3, carrying the common portion 20 of the information. This frame time-flags a data block sent within the network, managed by the data transmission system known as TDMA (Time Division Multiple Access), a system well-known by the skilled in the art.

Each frame carried by the channel 4 consists in a header number (numéro de frame depart) 22, indicating the beginning of the frame, and a footer number (numéro de frame fin) 24 indicating the end of the frame, and therefore the end of the data block to be transmitted.

The common portion 20 of the information may consist in several frames—frame# 1, frame#2— if for example it is too bulky to be carried into one single frame, or if it is made of different images or video sequences.

The metafile 12 may also include several pointers 14, in the case where the common portion 20 of the information consists in several data blocks of different types, e.g. images, sound and text.

The synchronization data 16 allows the terminal 3, which will receive the metafile 12, to synchronize the personal portion 10 of the information with its common portion 20.

As an example, this synchronization data 16 allows to synchronize some text, representing the personal portion 10 of the information, with images and sound representing the common portion 20 of the information.

The synchronization method including such data is based on HTML (Hyper Text Mark-up Language, a language suited for service data over the Internet), or SMIL (Synchronized Multimedia Integration Language), known in the prior art.

In the embodiment where the terminal 3 needs to query the network for the common portion 20 of the information, the terminal 3 comprises a specific microprocessor (not represented). This specific microprocessor controls a broadcast channel selector, and selects the appropriate channel, the header 22 and footer 24 IDs (numéros de frame départ et fin).

The terminal fetches the common portion 20 of the information, and builds up a third database 6 to synchronize the personal portion 10 and the common portion 20 of the information.

This database 6 is either embedded in the terminal, or, in an alternative embodiment, is located within the network in the case for example where the size of the built-up information exceeds the storing or data processing capabilities of the terminal 3.

Once the two portions 10, 20 of the information are synchronized within the database, the built-up information is then presented to the user of the terminal 3 through a display screen 7, and possibly through other components of the terminal 3, such as a loudspeaker for example.

In that way, the built-up information is divided into data groups of a size that can be managed by the terminal 3. The terminal 3 queries this database 6 for each data group, and displays them as they come to the user of the terminal 3. This method is generally known as the streaming (retrieval of data as and when needed) of a multimedia content.

We shall now describe an application example for one of the embodiments of the invention.

The multimedia content database 2 is a topic database for sports.

This database contains videos of different football matches between two football clubs, for example X and Y.

The database 1 defining the user's profile of the terminal 3 contains columns stating the user's fields of interest, and all the strictly confidential data.

As an example, the carrier that operates the network may send the latest goals of the X-Y match to every supporter of both teams, and simultaneously an advertisement for the Soda drink.

The user of the terminal 3 is a supporter of the X team, and he wants to get every possible information on M. Z, a player of this team. This user is called M. Fan.

The network creates a metafile 12 by using the database 1.

This metafile contains:

the said personal portion 10 of the information to be broadcasted to the terminal 3 (for example, the sentence <<Dear M. Fan, here comes a goal by M. Z>>, with this user's favourite advertising jingle, a pointer 14, containing the identification number of the broadcast channel 4, used for transmitting the common portion 20 of the information to be received by the terminal 3 (for example, channel 123, on which the video of the latest X-Y match is sent); the frame header and footer IDs, as described in FIG. 3, carrying the common portion 20 of the information (for example, between bytes 821 and 821821 where M. Zidane's goal is located), the synchronization data 16 allows the terminal 3, which will receive the metafile 12, to synchronize the personal portion 10 of the information with its common portion 20. The metafile 12 is received by the terminal 3. The terminal 3 must query the network for the common portion 20 of the information: one of its microprocessors commands a broadcast channel selector, selects the appropriate channel (channel 123), and the header 22 and footer 24 IDs (821 and 821821), then the terminal fetches the common portion 20 of the information and builds up a third database 6 in order to synchronize the personal portion 10 and the common portion 20 of the information.

The terminal 3 displays the following screen for M. Fan:

---

Dear M. Fan, here comes M. Z's goal
  VIDEO OF THE RELEVANT GOAL, synchronized with M. Fan's favourite jingle
                                                                DRINK SODA ! !

---

The invention claimed is:

1. A method for broadcasting, within a telecommunication network, of at least one piece of information to at least one radiocommunication terminal (3), said network comprising a server and at least two types of transmission channels (4, 5), wherein the information is divided into a personal portion (10), dedicated to a single terminal, and a common portion (20) common to every terminal having subscribed to such network, said information being transmitted over two types of data transmission channels (4, 5), the first type of channel (4) being dedicated to the said personal portion (10) of the information, the second type of channel (5) being dedicated to the said common portion (20) of the information.

2. A broadcasting method according to claim 1, further comprising:
   a step for stocking the data defining a user profile for each of the terminals (3) having subscribed to said network, within a first database (1), and
   a step for stocking the content data within a second database (2), wherein said user profile data represent said personal portion (10) of the information, and said content data represent the said common portion (20) of the information.

3. A broadcasting method according to claim 1, wherein the terminals (3) receive said personal portion (10) of the information, and query the network server for said common portion (20) of the information.

4. A broadcasting method according to claim 2, wherein the terminals (3) receive said personal portion (10) of the information, and query the network server for said common portion (20) of the information.

5. A broadcasting method according to claim 1, wherein the terminals (3) simultaneously receive from the network server said personal portion (10) of the information, and said common portion (20) of the information.

6. A broadcasting method according to claim 2, wherein the terminals (3) simultaneously receive from the network server said personal portion (10) of the information, and the said common portion (20) of the information.

7. A broadcasting method according to claim 1, wherein the terminal (3) synchronizes said personal portion (10) and the said common portion (20) and displays them to the user.

8. A broadcasting method according to claim 2, wherein the terminal (3) synchronizes said personal portion (10) and the said common portion (20) and displays them to the user.

9. A broadcasting method according to claim 3, wherein the terminal (3) synchronizes said personal portion (10) and the said common portion (20) and displays them to the user.

10. A broadcasting method according to claim 1, wherein the terminal (3) builds up a third database (6), in order to combine said personal portion (10) with said common portion (20) of the information.

11. A broadcasting method according to claim 2, wherein the terminal (3) builds up a third database (6), in order to combine said personal portion (10) with said common portion (20) of the information.

12. A broadcasting method according to claim 3, wherein the terminal (3) builds up a third database (6), in order to combine said personal portion (10) with said common portion (20) of the information.

13. A broadcasting method according to claim 10, wherein said third database (6), combining said personal portion (10) and said common portion (20) of the information, is either located within the network, or embedded in the terminal (3).

14. A broadcasting method according to claim 1, wherein said second type of channel (5) is a broadcast channel.

15. A broadcasting method according to claim 2, wherein said second type of channel (5) is a broadcast channel.

16. A broadcasting method according to claim 3, wherein said second type of channel (5) is a broadcast channel.

17. A broadcasting method according to claim 10, wherein said second type of channel (5) is a broadcast channel.

18. A broadcasting method according to claim 13, wherein the terminal (3) contains a microprocessor that controls a broadcast channel selector, allowing it to select among all the broadcast channels within the network the one where it will find the said common portion (20).

19. A broadcasting method according to claim 14, wherein the terminal (3) contains a microprocessor that controls a broadcast channel selector, allowing it to select among all the broadcast channels within the network the one where it will find the said common portion (20).

20. A system for broadcasting one or more information to one or more radiocommunication terminal (3), said system comprising a server, located within a radiocommunication network comprising one or more different types of transmission channels (4, 5), a user database (1) containing the profiles of the users of the terminals (3), and a common database (2) shared by all the users of terminals (3),
   wherein said information is divided into a personal portion (10), dedicated to a given terminal, and a common portion (20) common to every terminal (3), said user database (1) being used to build up said personal portion (10) of the information, and said common database (2) comprising multimedia content data (20) that are common to every user of the terminals (3), said server having means of accessing both the user (1) and common (2) databases, via respectively a first channel (4) and a second channel (5), as well as means if transmitting such data to a given terminal (3), over the data transmission channels (4, 5) of different types.

21. A radiocommunication terminal, suited for operating within a radiocommunication network comprising one or more different types of data transmission channels (4, 5), wherein said terminal comprises means of analyzing personal data (10) originating from the first channel (4), means of extracting from said personal data (10) a specific data allowing it to fetch over the second channel (5) common data (20) shared by all the users of terminals (3), means of combining the personal (10) and second common (20) data, and means of displaying these for the user of the terminal (3).

22. A broadcasting method according to claim 10, wherein said third database (6), combining said personal portion (10) and said common portion (20) of the information, is embedded in the terminal (3).

23. A broadcasting method according to claim 22, wherein the terminal (3) contains a microprocessor that controls a broadcast channel selector, allowing it to select among all the broadcast channels within the network the one where it will find the said common portion (20).

* * * * *